United States Patent
Colosimo

[15] 3,690,396
[45] Sept. 12, 1972

[54] FOUR-TRACK VEHICLE

[72] Inventor: Samuel R. Colosimo, 2304 Perricrest Dr., Pittsburgh, Pa. 15220

[22] Filed: Jan. 28, 1971

[21] Appl. No.: 110,470

[52] U.S. Cl. .................. 180/9.2 R, 180/9.64, 305/27
[51] Int. Cl. ........................................... B62d 55/10
[58] Field of Search ...... 180/9.2 R, 9.5, 9.54; 305/31, 305/32

[56] References Cited

UNITED STATES PATENTS

| | | | |
|---|---|---|---|
| 1,749,276 | 3/1930 | Edmonds | 180/9.2 R |
| 1,809,344 | 6/1931 | Linn | 305/31 |
| 3,455,405 | 7/1969 | Parent | 180/9.5 X |
| 3,533,482 | 10/1970 | Cushman | 180/9.2 R |

FOREIGN PATENTS OR APPLICATIONS 685,939    12/1939    Germany ................ 180/9.2 R Primary Examiner—Philip Arnold
Attorney—Brown, Murray, Flick & Peckham

[57] ABSTRACT

A vehicle is provided with four laterally spaced track units, each of which includes a travelling endless track. Above the track units there is a chassis floor, from which laterally spaced rigid members extend down between the track units. Means are provided for connecting the track units to these rigid members beside them to support the floor. Such means, which include horizontal pivots, are constructed and arranged to allow the track units to tilt laterally. The drive shafts for the endless tracks are so constructed as not to interfere with tilting of the track units. At the back of the vehicle, readily accessible means are provided for taking up slack in the endless tracks.

5 Claims, 4 Drawing Figures

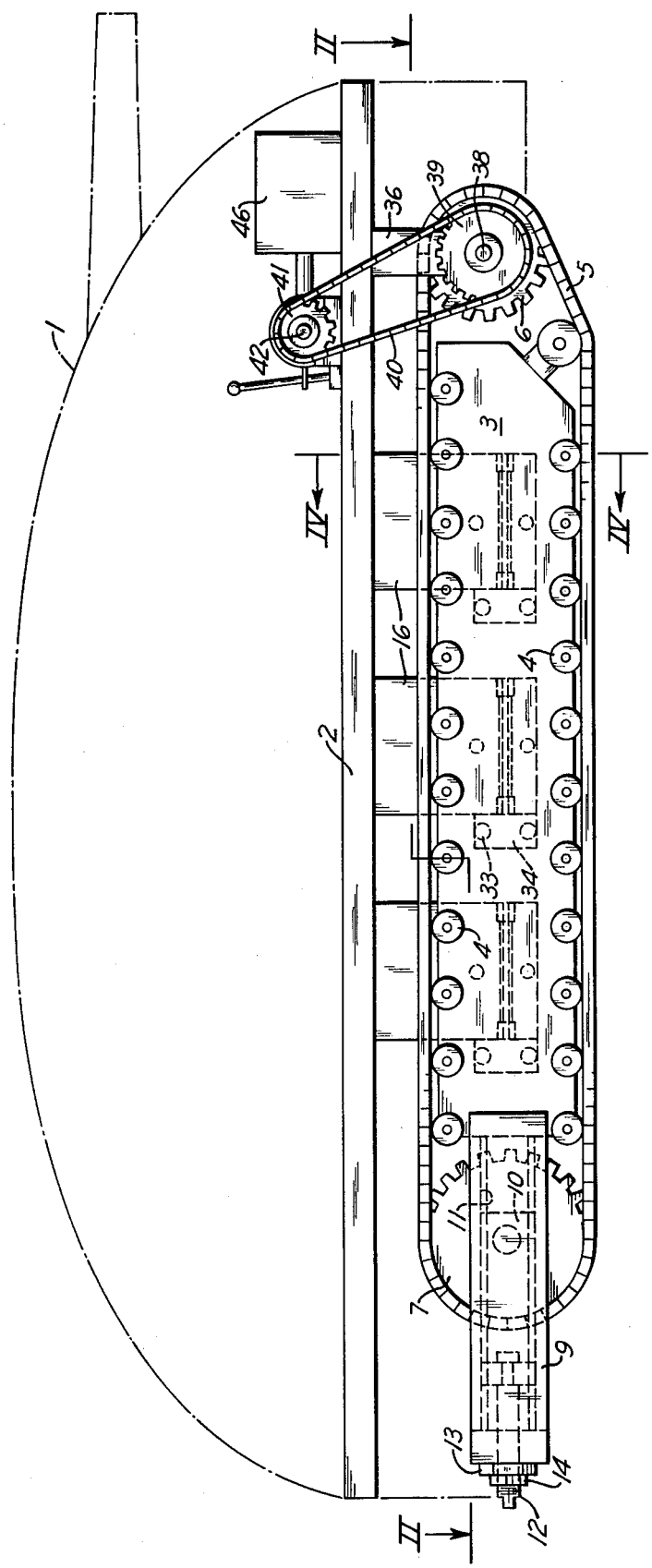

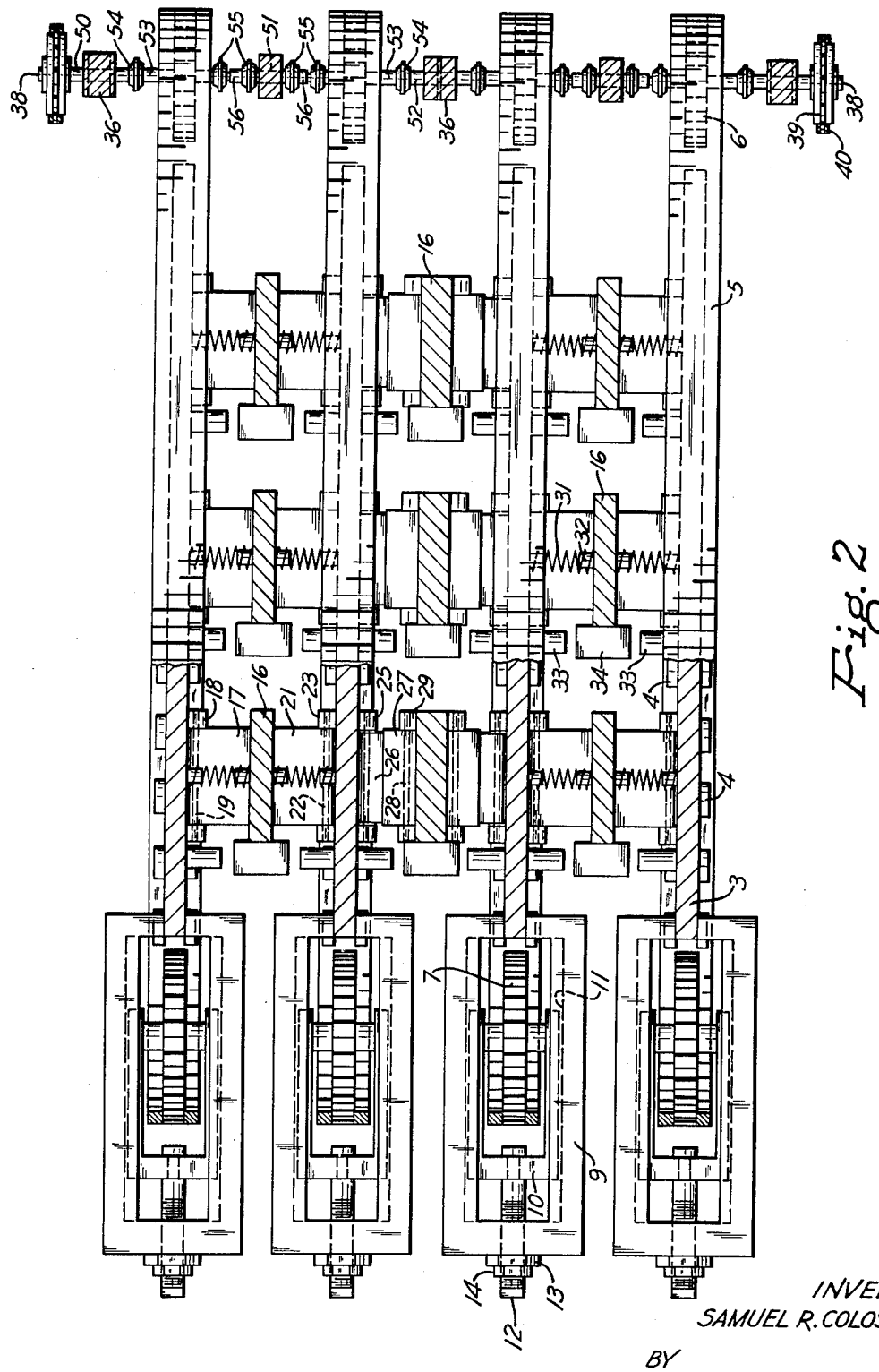

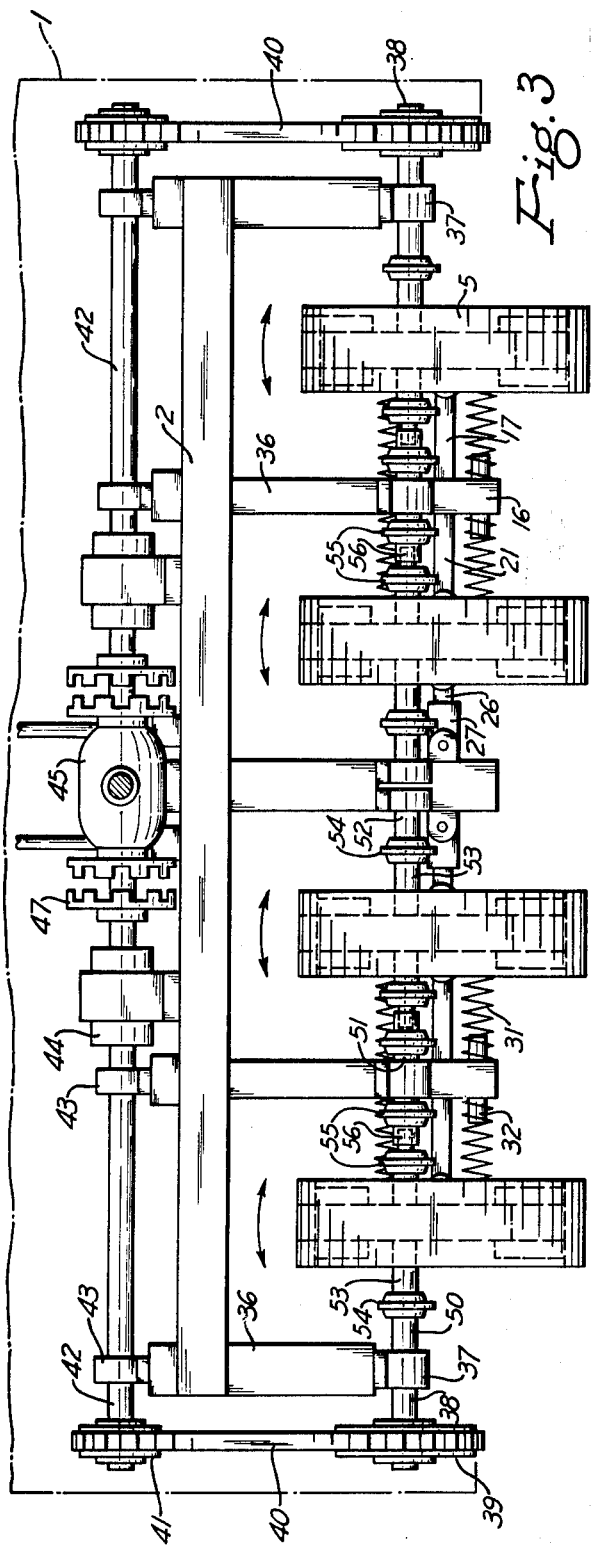
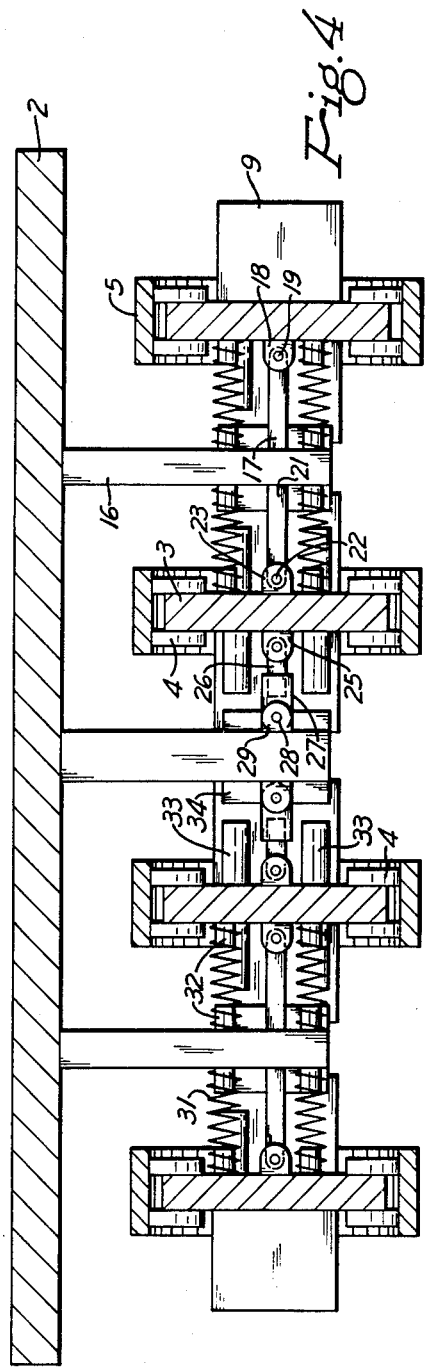

FOUR-TRACK VEHICLE

Vehicles, such as tractors, road working machinery and military tanks, are provided with travelling endless tracks for propelling them over the ground. Usually each vehicle has only two of these tracks, but there are cases where more than two tracks are used side by side. When the vehicle travels on uneven ground, there are many places where only one edge of an endless track will engage the ground, due to the lower surfaces of all of the tracks being permanently located in a single common plane being permanently located in a single common plane parallel to the chassis floor above them. Also, if an endless track becomes slack, a man must crawl under the vehicle and perform difficult work to take up the slack.

It is among the objects of this invention to provide a four-track vehicle, in which all of the travelling tracks adjust themselves to rest flat on the ground even through it is irregular, and in which the tension on the endless tracks can readily be adjusted from fully exposed positions behind the vehicle.

The preferred embodiment of the invention is illustrated in the accompanying drawings, in which FIG. 1 is a side view;

FIG. 2 is a horizontal section taken on the line II—II of FIG. 1;

FIG. 3 is an enlarged front end view; and

FIG. 4 is an enlarged cross section taken on the line IV—IV of FIG. 1.

The vehicle disclosed herein is a heavy duty vehicle that is propelled by caterpillar-type treads or travelling endless tracks. It can be designed for military use or for road construction work and the like. In FIG. 1 of the drawings, a military tank body 1 is indicated in broken lines but it could just as well be a body suitable for construction work. The body is supported by a chassis floor 2 mounted on four parallel track units disposed side by side with considerable space between them. Each unit includes a long heavy plate 3 disposed on edge, with series of rollers 4 journalled near its upper and lower edges and projecting above and below them for engagement by the upper nd lower lengths of an endless flexible track 5 that extends around front and rear sprockets 6 and 7. Rigidly connected to the rear end of each plate is the front end of a horizontal rectangular frame 9 extending rearwardly from the plate. Inside this frame, as shown in FIG. 2, there is a U-shaped bracket 10 slidably mounted in longitudinal slots 11 in the opposite sides of the frame. In the open front end of the bracket the rear sprocket 7 is rotatably mounted. A screw 12 is rigidly mounted in the rear end of the bracket and extends through an opening in the rear end of the bracket and behind it. Mounted on the projecting end of the screw is a large nut 13 for engagement with the back of the frame. By turning the nut in one direction or the other the bracket can be pulled backward or allowed to move forward in the frame and then maintained in that position by a lock nut 14. This provides a very convenient, quick and safe way to adjust the tension on the flexible tracks and take up slack, without requiring a man to crawl under the vehicle and work in cramped quarters.

The chassis floor is mounted on the upper ends of a number of heavy vertical plates 16. Three of these plates are shown in a row between each pair of track units, each set of three being spaced apart lengthwise of the track units in a straight line. The plates extend a considerable distance down between the track units. Welded to the outer surfaces of plates 16 in the two outer rows and projecting outwardly therefrom are short horizontal plates 17 the outer ends of which are straddled by lugs 18 on the inner faces of track plates 3, as shown in FIGS. 2 and 4. Horizontal pivot pins 19 extend through these lugs and the horizontal plates. Similar horizontal plates 21 project from the inner surfaces of the outer rows of vertical plates and are pivotally connected by pins 22 to lugs 23 projecting from the outer sides of the central pair of track plates 3. The inner sides of this central pair of track plates are likewise provided with lugs 25, which are pivotally connected to the outer ends of short plates 26 extending inwardly therefrom. The inner ends of the latter plates, however, are not rigidly secured to the central row of vertical plates 16, but are telescoped in heavy rectangular sleeves 27 that are pivotally connected by horizontal pins 28 to lugs 29 at their opposite ends. These lugs are secured to the opposite sides of the central row of vertical plates 16.

With the construction just described, it is possible for the track units to tilt sideways in either direction, but other ways of providing for the tilting could be used. For example, a single plate could be substituted for each short plate 26 and its sleeve 27, with horizontal pivots at both ends but with one of the pivots mounted in a horizontal slot to compensate for the variation in spacing between a track plate 3 and a vertical plate 16 when the track unit tilts. The track units normally are held parallel to the rows of vertical plates beside them by means of very heavy coil springs 31 mounted on bosses 32 on the track plates and plates 16. Also, lateral tilting of the track units, when it occurs, is limited by bumpers 33 projecting from the track plates, with the free ends of the bumpers spaced a short distance from stop blocks 34 secured to the rear edges of vertical plates 16.

In order to support the front sprockets 6, five heavy supports 36 extend downwardly from the chassis floor near its front end, as shown in FIGS. 1, 2 and 3. The three central supports are in line with the rows of vertical plates 16. The two outermost supports are located outwardly of all of the front sprockets. Bearings 37 are mounted on the lower ends of these supports for two shafts 38 that drive the front sprockets. Each shaft is independently driven from its outer end by a small sprocket 39 thereon driven by a chain 40 from a sprocket 41 on the outer end of a drive shaft 42 journalled in bearings 43 mounted on the chassis floor. The inner ends of the two drive shafts extend through brake units 44 and are spaced apart by a differential 45 driven by an internal combustion engine 46 mounted on the chassis floor in front of it. The differential can be operatively connected to both drive shafts, or to either one, by means of clutches 47 under the control of the operator, which permits the vehicle to be steered.

In order to prevent the shafts 38 from interfering with tilting of the track units, the shafts are flexible. For example, each shaft can be made up of a plurality of aligned sections connected by universal joints. In such a case, the shaft sections 50, 51 and 52 that are journalled in the bearings can rotate only, but they are flexibly connected to the shaft sections 53 that are rigidly mounted in the front sprockets. This is done by one universal joint 54 at one side of each track unit, and by two universal joints 55 at the opposite side connected by telescoping splined shaft sections 56. The shaft sections 53 in the sprockets can tilt with the track units while the shafts are rotating. All of the shaft sections can have limited axial movement in the universal joints.

If any one of the track units encounters a stretch of ground that slopes transversely of the vehicle as it travels along, that track unit can accommodate itself to the slope by tilting laterally so that the lower surface of the track will continue to bear flat against the ground. When the ground flattens out again, the tilted track unit will return to its normal position parallel to the other track unit.

According to the provisions of the patent statues, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A four-track vehicle comprising four laterally spaced track units extending lengthwise of the vehicle and provided with traveling endless tracks and vertical drive sprockets around which the tracks extend, a chassis floor above said units provided with laterally spaced vertical rigid members extending down between the track units and spaced therefrom, means connecting the track units to said members beside them to support said floor, said means including horizontal pivots extending lengthwise of said track units and being constructed and arranged to allow the track units to tilt laterally in either direction independently of one another, drive shafts for said sprockets extending transversely of the vehicle, bearings for the shafts, means beneath the chassis floor supporting said bearings, universal joints in the shafts at both sides of each track unit, telescoping splined connections in the shafts beside the track units, said universal joints and telescoping connections giving flexibility to said shafts when the track units are tilted laterally, and means supported by the chassis floor for rotating the shafts.

2. A four-track vehicle comprising four laterally spaced track supports extending lengthwise of the vehicle, an endless track extending lengthwise around each of said supports and engaging its top and bottom, means for driving said endless tracks, a chassis floor above said tracks provided with laterally spaced vertical supporting members extending down between said track supports, and means connecting the track supports to said vertical members beside them to support said floor, said connecting means including rigid members projecting laterally outward from the outermost of said vertical members, horizontal pivots extending lengthwise of the vehicle and connecting the two outer track supports to said rigid members to permit those track supports to tilt laterally, rigid members between one side of each of the other two track supports and the adjacent vertical members and rigidly secured to the vertical members, horizontal pivots extending lengthwise of the vehicle and connecting said last-mentioned rigid members to said other two track supports to permit those supports to tilt laterally, means flexibly connecting the opposite side of each of said other two track supports with the adjacent vertical members, and springs connecting said track supports to said vertical members in positions to normally hold the supports parallel to the vertical members.

3. A four-track vehicle according to claim 2, in which said flexibly connecting means include normally horizontal telescoping members pivotally connected on horizontal axes with the adjoining track supports and vertical members.

4. A four-track vehicle according to claim 2, in which said track units include vertical drive sprockets around which said endless tracks extend, and said driving means include flexible drive shafts for the sprockets extending transversely of the vehicle, and means for rotating the shafts.

5. A four-track vehicle according to claim 2, in which said track units include vertical drive sprockets around which said endless tracks extend, and said driving means include telescoping drive shafts for the sprockets extending transversely of the vehicle, universal joints in the shafts, and means on said chassis floor and operatively connected with said shafts for rotating them.

* * * * *